S. H. SCHEETZ.
COMBINED HOT AND COLD WATER SPIGOT.
APPLICATION FILED JUNE 6, 1919.
1,355,915.
Patented Oct. 19, 1920.
2 SHEETS—SHEET 1.
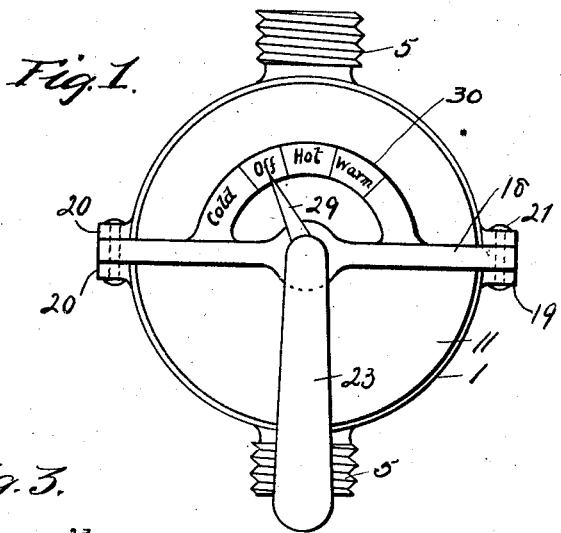
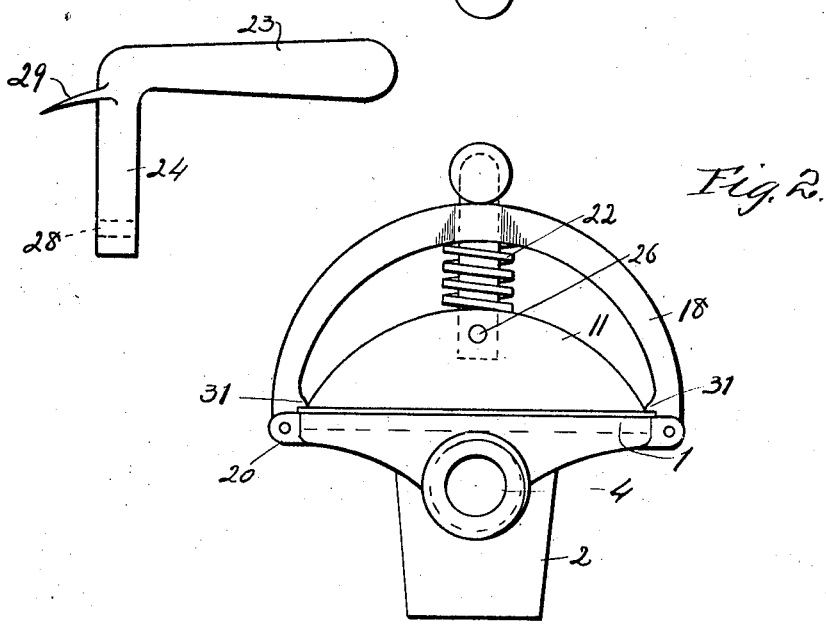
Inventor
Stephen H. Scheetz
By W. W. Williamson
Atty.

S. H. SCHEETZ.
COMBINED HOT AND COLD WATER SPIGOT.
APPLICATION FILED JUNE 6, 1919.

1,355,915.

Patented Oct. 19, 1920.
2 SHEETS—SHEET 2.

Inventor
Stephen H. Scheetz
By W. W. Williamson
Atty.

UNITED STATES PATENT OFFICE.

STEPHEN H. SCHEETZ, OF PHILADELPHIA, PENNSYLVANIA.

COMBINED HOT AND COLD WATER SPIGOT.

1,355,915. Specification of Letters Patent. Patented Oct. 19, 1920.

Application filed June 6, 1919. Serial No. 302,190.

*To all whom it may concern:*

Be it known that I, STEPHEN H. SCHEETZ, a citizen of the United States, residing at Philadelphia, in the county of Philadelphia and State of Pennsylvania, have invented a new and useful Improvement in Combined Hot and Cold Water Spigots, of which the following is a specification.

My invention relates to a new and useful improvement in a combined hot and cold water spigot, and has for its object to provide a faucet of this description which will permit the drawing of either cold water or hot water, or the intermingling of hot and cold water during its outflow, so as to have it issue from the faucet at any desired temperature.

A further object of my invention is to provide a simple, effective and conspicuous indicator, which will determine the temperature of the water being drawn through the spigot.

A still further object of my invention is to provide a flat faced valve seat and a spring pressed valve which requires no packing.

With these ends in view, this invention consists in the details of construction and combination of elements hereinafter set forth, and then specifically designated by the claims.

In order that those skilled in the art to which this invention appertains may understand how to make and use the same, I will describe its construction in detail, referring by numerals to the accompanying drawing forming a part of this application, in which:

Figure 1 is a plan view of the spigot made in accordance with my improvement.

Fig. 2 is a side elevation thereof.

Fig. 3 is a detail view of the handle and pointer.

Figure 4:
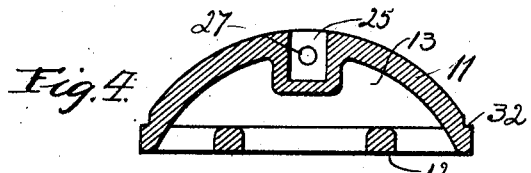
Fig. 4 is a central section of the valve member.
Figure 5:
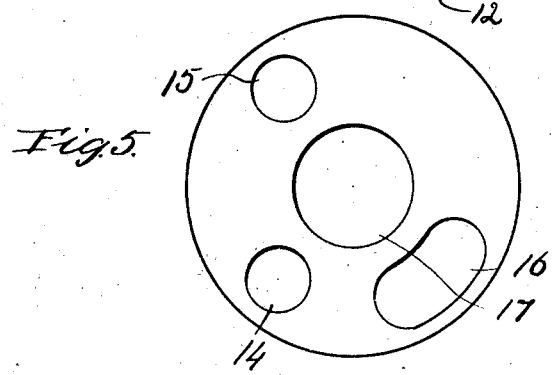
Fig. 5 is a bottom plan view of Fig. 4.
Figure 6:
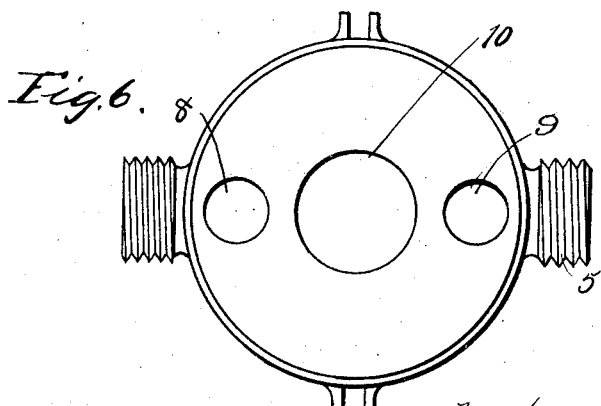
Fig. 6 is a plan view of the spigot, the valve member being removed therefrom.
Figure 7:
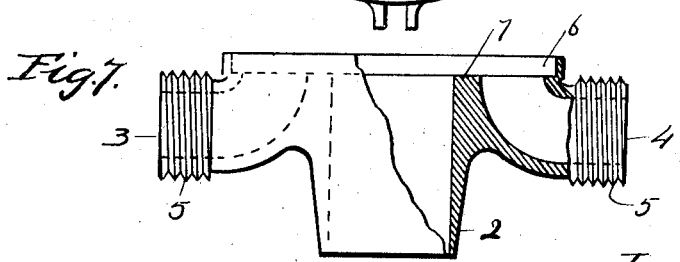
Fig. 7 is an elevation, partly in section, of Fig. 6.

In carrying out my invention as here embodied—

1 represents the body of the spigot, having formed therewith the outlet 2, the cold water inlet 3 and the hot water inlet 4, both of which latter are provided with external threads 5 for coupling with the cold and hot water service pipes.

In the top of the spigot body is formed an annular recess 6 the face 7 of which constitutes the valve seat, and through this seat are formed the openings 8 and 9, the former communicating with the interior of the cold water inlet 3, and the latter communicating with the interior of the hot water inlet 4, also through this valve seat is formed the outlet opening 10, which leads to the outlet 2.

11 represents the valve member which is dome shaped, having a flat bottom face 12 adapted to fit against the valve seat 7, the periphery of this valve member fitting in the recess 6, so as to hold it in proper relative position to the valve seat while permitting it to turn thereon.

The valve member is hollow or has a cavity 13 formed therein, and through the face of this member are formed the cold water openings 14 and 15, and the hot water opening 16, all of said openings leading to said cavity, and this member also has formed through the face thereof the outlet opening 17, which leads from the cavity, the functions of which are hereafter described.

18 represents a yoke, the ends of which are secured between the lugs 19 and 20 formed upon the body by means of the pins 21, and this yoke is of such dimensions that a spring 22 may be imposed therebetween and the top of the valve member 11, as clearly shown in Fig. 2.

23 represents the handle for operating the valve member, which has a stem 24 formed therewith, the latter projecting downwardly through a suitable opening in the center of the yoke, and into the socket 25 formed in the valve member, and is therein secured by the pin 26 passing through the hole 27, and a suitable hole 28 formed in the lower portion of the stem. With this stem is formed a pointer 29 adapted to travel over the dial 30, which is formed with the yoke 18.

In order that the valve member may be securely held in place when the spigot is assembled, lugs 31 are formed near the ends of the yoke and project over the annular shoulder 32 formed upon said valve member. The dial has inscribed thereon the words Cold, Off, Hot and Warm, so that when the pointer is turned to any one of these words, it is thereby indicated that the valve member is in position to draw the temperature of water corresponding with that particular word, and to accomplish this the openings 14, 15 and 16 are so located, relative to the openings 8 and 9, that when the pointer is set at Off, none of the openings 14, 15 or 16 registers with either of the openings 8 or 9, but when the pointer is set at Cold, the opening 14 will register with the opening 8, permitting the cold water to flow through the cold water inlet 3 into the cavity 13 in the valve member, and from this through the opening 10 to the outlet 2 of the spigot, and when the valve member is thus set the opening 16 will be out of register.

When it is desired to draw hot water, the pointer is turned to the word Hot, which will carry the opening 14 out of register with the opening 8, and bring the opening 16 into register with the opening 9, thus permitting the hot water to flow through the inlet 4 to the cavity in the valve member and from this through the opening 10 to the outlet 2.

When an intermixture of hot and cold water is desired, the setting of the pointer at the word Warm will bring the opening 15 into partial or entire alinement with the opening 8, and also the opening 16 into partial or entire alinement with the opening 9, in which case more or less of both cold and hot water will be admitted to the cavity, therein intermingled, and pass through the opening 10 to the outlet 2.

The opening 16 is elongated in order that the admission of the hot water relative to the amount of cold water admitted may be varied as required, and this would be shown on the indicator by the position of the pointer between the radial lines inclosing the word Warm.

While the valve member is held in place by the lugs 31, the pressure thereon necessary to form a water tight joint with the valve seat is exerted by the spring 22, and as this spring pressure allows for expansion and contraction as well as wear, it follows that the valve requires no packing.

Of course I do not wish to be limited to the exact details of construction as herein shown, as these may be varied within the limits of the appended claims without departing from the spirit of my invention.

Having thus fully described my invention, what I claim as new and useful is:

1. A combined cold and hot water valve, including a body, a valve seat formed upon the top of said body, a valve member adapted to fit upon said valve seat, a yoke attached to the body, lugs formed with the yoke, and overhanging the valve member so as to prevent the renewal of the latter from its seat, a stem passing through the yoke and secured in the valve member, a pointer projecting from the stem, a dial carried by the yoke over which the pointer travels, a handle projecting from the stem, and a spring interposed between the yoke and the valve member forcing the latter against its seat.

2. In a device of the character described, a body, having a hot and a cold water inlet thereto, a valve seat formed upon said body through which the said inlets pass, a valve member adapted to fit upon the valve seat, said valve member having a cavity therein and a series of openings from the face thereof for registering with the openings in the valve seat, lugs formed upon the body, a yoke secured to said lugs, a stem having a handle formed therewith said stem projecting through the yoke and being secured to the valve member, a spring interposed between the yoke and the valve member for forcing the latter upon the valve seat, a stationary dial, and a pointer carried by the stem adapted to move over said dial.

In testimony whereof, I have hereunto affixed my signature.

STEPHEN H. SCHEETZ.